US012394346B2

(12) United States Patent
Lim

(10) Patent No.: US 12,394,346 B2
(45) Date of Patent: Aug. 19, 2025

(54) SHIFT REGISTER AND DISPLAY APPARATUS INCLUDING THE SAME

(71) Applicant: Samsung Display Co., Ltd., Yongin-Si (KR)

(72) Inventor: Jaekeun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/542,770

(22) Filed: Dec. 18, 2023

(65) Prior Publication Data

US 2024/0212549 A1 Jun. 27, 2024

(30) Foreign Application Priority Data

Dec. 22, 2022 (KR) ........................ 10-2022-0182303

(51) Int. Cl.
*G09G 3/20* (2006.01)
*G09G 3/32* (2016.01)
*G09G 3/3266* (2016.01)

(52) U.S. Cl.
CPC ................. *G09G 3/20* (2013.01); *G09G 3/32* (2013.01); *G09G 3/3266* (2013.01); *G09G 2300/0819* (2013.01); *G09G 2300/0842* (2013.01); *G09G 2300/0861* (2013.01); *G09G 2310/0267* (2013.01); *G09G 2310/0286* (2013.01)

(58) Field of Classification Search
None
See application file for complete search history.

(56) References Cited

U.S. PATENT DOCUMENTS 8,669,969 B2 3/2014 Chung
11,741,903 B2 * 8/2023 In .......................... G09G 3/3233 345/212
2007/0057877 A1 * 3/2007 Choi .................... G09G 3/3291 345/76
2009/0225068 A1 * 9/2009 Jeong ................... G09G 3/3266 345/76
2012/0098877 A1 * 4/2012 Taro ..................... G09G 3/3225 345/691
2012/0176417 A1 * 7/2012 Jang ..................... G11C 19/184 345/77

(Continued)

FOREIGN PATENT DOCUMENTS

KR 10-1084182 B1 11/2011

*Primary Examiner* — Dorothy Harris
(74) *Attorney, Agent, or Firm* — Innovation Counsel LLP

(57) ABSTRACT

A shift register includes a plurality of stages. At least one of the stages is configured to receive an input signal, a first clock signal, a second clock signal, a first power voltage and a second power voltage and to output an output signal. The at least one of the stages includes a pull up switching element connected between a first power voltage terminal configured to receive the first power voltage and an output terminal configured to output the output signal, a pull down switching element connected between a second power voltage terminal configured to receive the second power voltage and the output terminal, a first pull down control switching element connected to a control electrode of the pull down switching element and a second pull down control switching element connected to the first power voltage terminal and the control electrode of the pull down switching element.

20 Claims, 10 Drawing Sheets

(56) References Cited

U.S. PATENT DOCUMENTS

| | | | | |
|---|---|---|---|---|
| 2013/0222352 | A1* | 8/2013 | Jeong | G11C 19/184 345/205 |
| 2014/0111403 | A1* | 4/2014 | Kim | G09G 3/3266 377/64 |
| 2015/0179101 | A1* | 6/2015 | Ohara | G09G 3/3233 315/172 |
| 2016/0155409 | A1* | 6/2016 | Jeoung | G09G 3/3696 345/214 |
| 2016/0322116 | A1* | 11/2016 | Jang | G11C 19/28 |
| 2016/0379545 | A1* | 12/2016 | Zhou | G11C 19/287 345/213 |
| 2021/0225253 | A1* | 7/2021 | Li | G11C 19/28 |
| 2021/0366408 | A1* | 11/2021 | In | G09G 3/3266 |
| 2023/0351941 | A1* | 11/2023 | In | G09G 3/3233 |

* cited by examiner

SHIFT REGISTER AND DISPLAY APPARATUS INCLUDING THE SAME

PRIORITY STATEMENT

This application claims priority, under 35 U.S.C. § 119, to Korean Patent Application No. 10-2022-0182303 filed on Dec. 22, 2022 in the Korean Intellectual Property Office KIPO, the content of which is herein incorporated by reference in its entirety.

BACKGROUND

1. Field

The present inventive concept relates to a shift register and a display apparatus including the shift register. More particularly, the present inventive concept relates to a shift register stably outputting an output signal and a display apparatus including the shift register.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

The gate driver and the emission driver may include a shift register outputting the gate signal and the emission signal. When a level of a control signal of a pull down switching element for pulling down an output signal in the shift register circuit is unstable, a low level of the output signal may be unstable.

When the low level of the output signal is unstable, a reliability of the gate driver and the emission driver may be decreased. In addition, when the low level of the output signal is unstable, malfunctions of turn-on and turn-off operations of transistors in pixels may occur so that a display quality of the display panel may be deteriorated.

SUMMARY

Embodiments of the present inventive concept provide a shift register capable of stably outputting an output signal.

Embodiments of the present inventive concept provide a display apparatus including the shift register.

In an embodiment of a shift register according to the present inventive concept, the shift register includes a plurality of stages. At least one of the stages is configured to receive an input signal, a first clock signal, a second clock signal, a first power voltage and a second power voltage and to output an output signal. The at least one of the stages includes a pull up switching element connected between a first power voltage terminal configured to receive the first power voltage and an output terminal configured to output the output signal, a pull down switching element connected between a second power voltage terminal configured to receive the second power voltage and the output terminal, a first pull down control switching element connected to a control electrode of the pull down switching element and a second pull down control switching element connected to the first power voltage terminal and the control electrode of the pull down switching element.

In an embodiment, the at least one of the stages may further include a first switching element configured to apply the input signal to a fourth node in response to the first clock signal, a second switching element configured to apply the first power voltage to a second node in response to a voltage of a first node and a third switching element configured to apply the second clock signal to the second node in response to a voltage of a third node.

In an embodiment, the at least one of the stages may further include a twelfth switching element configured to apply a voltage of the fourth node to a third node in response to the second power voltage.

In an embodiment, the at least one of the stages may further include a fourth switching element configured to apply the first clock signal to the first node in response to the voltage of the fourth node, a fifth switching element configured to apply the second power voltage to the first node in response to the first clock signal, a sixth switching element configured to connect a fifth node to a seventh node in response to the second clock signal, a seventh switching element configured to apply the second clock signal to the fifth node in response to a voltage of a sixth node, an eighth switching element configured to apply the first power voltage to the seventh node in response to the voltage of the fourth node and an eleventh switching element configured to connect the first node to the sixth node in response to the second power voltage.

In an embodiment, the fourth switching element may include a 4-1 switching element including a control electrode connected to the fourth node, a first electrode connected to the first node and a second electrode connected to a fourth intermediate node and a 4-2 switching element including a control electrode connected to the fourth node, a first electrode connected to the fourth intermediate node and a second electrode configured to receive the first clock signal.

In an embodiment, the at least one of the stages may further include a first capacitor including a first electrode connected to the first power voltage terminal and a second electrode connected to the seventh node.

In an embodiment, the at least one of the stages may further include a second capacitor including a first electrode connected to the fifth node and a second electrode connected to the sixth node.

In an embodiment, the at least one of the stages may further include a third capacitor including a first electrode connected to the second node and a second electrode connected to the third node.

In an embodiment, the at least one of the stages may further include a thirteenth switching element configured to apply the first power voltage to the fourth node in response to a protection signal.

In an embodiment, the protection signal may be configured to turn on the thirteenth switching element in an initial driving period and to turn off the thirteenth switching element in a normal driving period after the initial driving period.

In an embodiment, the at least one of the stages may further include a thirteenth switching element configured to apply the first power voltage to the third node in response to a protection signal.

In an embodiment, the at least one of the stages may further include a fourth capacitor including a first electrode connected to the control electrode of the pull down switching element and a second electrode connected to the second power voltage terminal.

In an embodiment of a display apparatus according to the present inventive concept, the display apparatus includes a display panel, a gate driver, a data driver and an emission driver. The display panel includes a pixel. The gate driver is configured to provide a gate signal to the pixel. The data driver is configured to provide a data voltage to the pixel. The emission driver is configured to provide an emission signal to the pixel. At least one of the gate driver and the emission driver includes a shift register. The shift register includes a plurality of stages. At least one of the stages is configured to receive an input signal, a first clock signal, a second clock signal, a first power voltage and a second power voltage and to output an output signal. The at least one of the stages includes a pull up switching element connected between a first power voltage terminal configured to receive the first power voltage and an output terminal configured to output the output signal, a pull down switching element connected between a second power voltage terminal configured to receive the second power voltage and the output terminal, a first pull down control switching element connected to a control electrode of the pull down switching element and a second pull down control switching element connected to the first power voltage terminal and the control electrode of the pull down switching element.

In an embodiment, the gate driver may include the shift register.

In an embodiment, the emission driver may include the shift register.

In an embodiment, the at least one of the stages may further include a first switching element configured to apply the input signal to a fourth node in response to the first clock signal, a second switching element configured to apply the first power voltage to a second node in response to a voltage of a first node and a third switching element configured to apply the second clock signal to the second node in response to a voltage of a third node.

In an embodiment, the at least one of the stages may further include a twelfth switching element configured to apply a voltage of the fourth node to a third node in response to the second power voltage.

In an embodiment, the at least one of the stages may further include a thirteenth switching element configured to apply the first power voltage to the fourth node in response to a protection signal.

In an embodiment, the at least one of the stages may further include a thirteenth switching element configured to apply the first power voltage to the third node in response to a protection signal.

In an embodiment, the at least one of the stages may further include a fourth capacitor including a first electrode connected to the control electrode of the pull down switching element and a second electrode connected to the second power voltage terminal.

According to the shift register and the display apparatus including the shift register, the first pull down control switching element and the second pull down control switching element may be connected to the control electrode of the pull down switching element. The first pull down control switching element has a diode connection so that a toggling of the third node may not be transmitted to the eighth node. Thus, the level of the control signal of the pull down switching element for pulling down the output signal may be stably maintained.

The level of the control signal of the pull down switching element is stably maintained so that the low level of the output signal may be stably maintained. The low level of the output signal is stably maintained so that the reliability of the gate driver and the emission driver may be enhanced. In addition, the low level of the output signal is stably maintained so that the display quality of the display panel may be enhanced.

BRIEF DESCRIPTION OF THE DRAWINGS

The above and other features and advantages of the inventive concept will become more apparent by describing in detailed embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
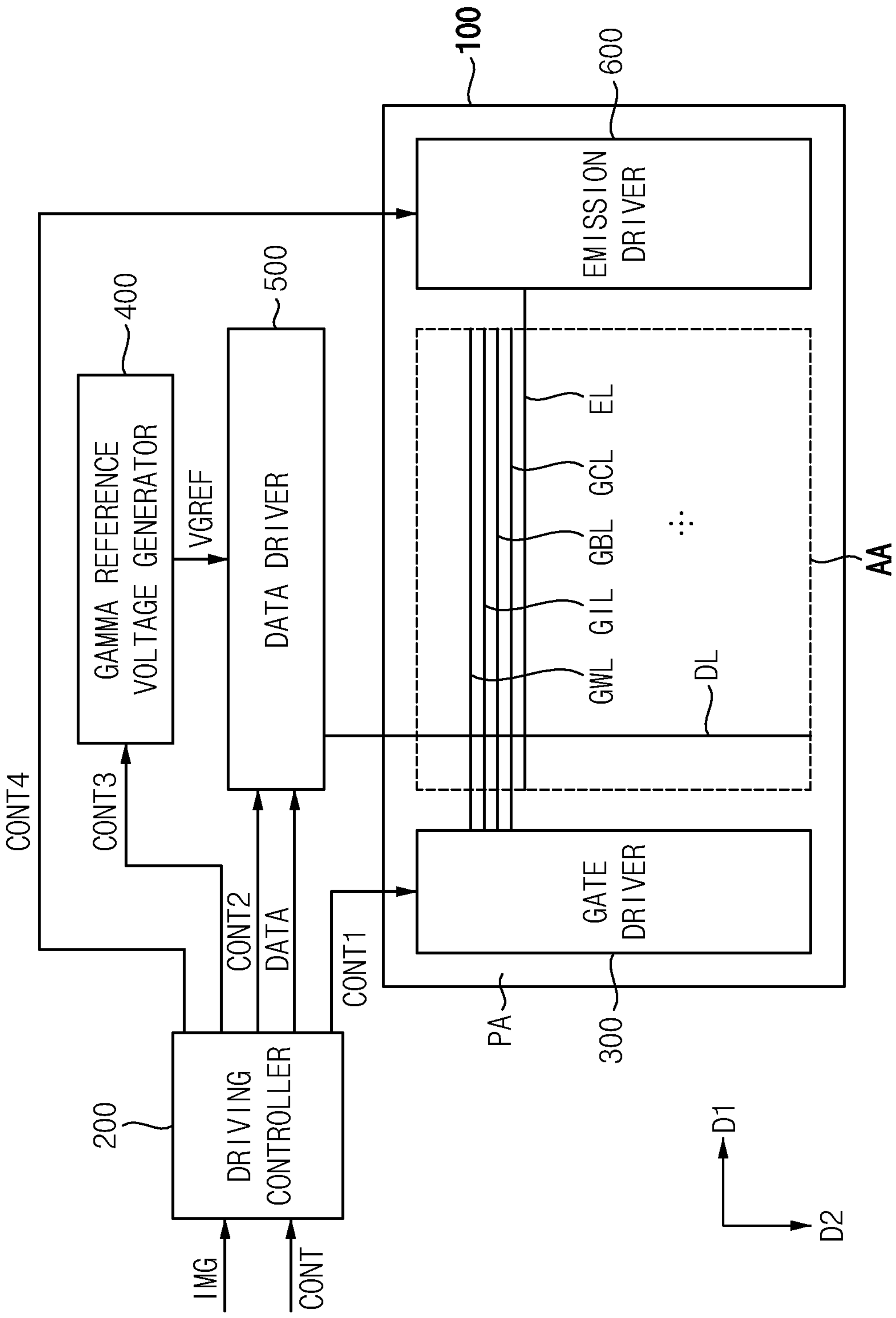
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400, a data driver 500 and an emission driver 600.

The display panel 100 has a display region AA on which an image is displayed and a peripheral region PA adjacent to the display region AA.

The display panel 100 includes a plurality of gate lines GWL, GIL, GBL and GCL, a plurality of data lines DL, a plurality of emission lines EL and a plurality of pixels electrically connected to the gate lines GWL, GIL, GBL and GCL, the data lines DL and the emission lines EL. The gate lines GWL, GIL, GBL and GCL may extend in a first direction D1, the data lines DL may extend in a second direction D2 crossing the first direction D1 and the emission lines EL may extend in the first direction D1.

The driving controller 200 may receive input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GWL, GIL, GBL and GCL in response to the first control signal CONT1 received from the driving controller 200. The gate driver 300 may output the gate signals to the gate lines GWL, GIL, GBL and GCL. For example, the gate driver 300 may be integrated with the peripheral region PA of the display panel 100. For example, the gate driver 300 may be mounted on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EL in response to the fourth control signal CONT4 received from the driving controller 200. The emission driver 600 may output the emission signals to the emission lines EL. For example, the emission driver 600 may be integrated on the peripheral region PA of the display panel 100. For example, the emission driver 600 may be mounted on the peripheral region PA of the display panel 100.

Although the gate driver 300 is disposed at a first side of the display panel 100 and the emission driver 600 is disposed at a second side of the display panel 100 opposite to the first side in FIG. 1 for convenience of explanation, the present inventive concept may not be limited thereto. For example, both of the gate driver 300 and the emission driver 600 may be disposed at the first side of the display panel 100. For example, the gate driver 300 and the emission driver 600 may be integrally formed.

Figure 2:
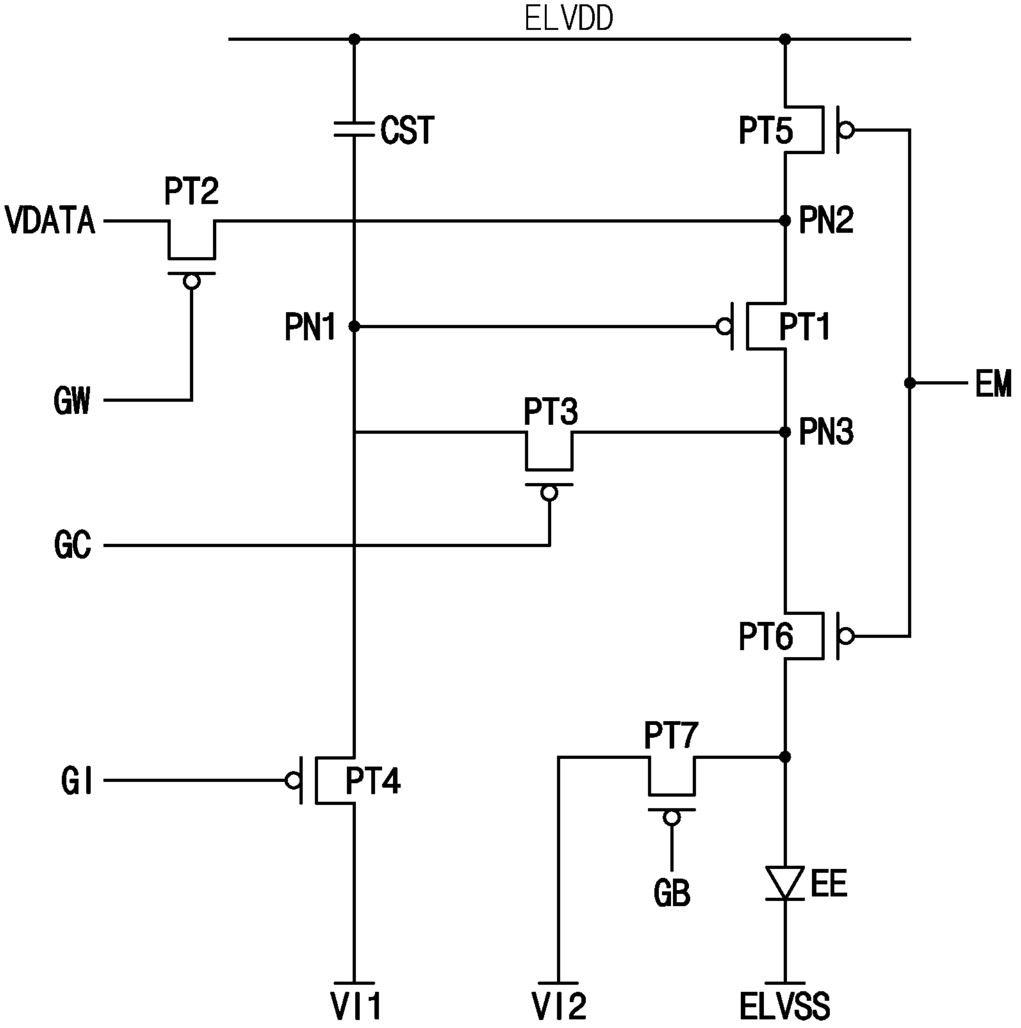
FIG. 2 is a circuit diagram illustrating a pixel of a display panel of FIG. 1.

FIG. 2 is a circuit diagram illustrating a pixel of the display panel 100 of FIG. 1.

Referring to FIGS. 1 and 2, the display panel 100 includes the plurality of the pixels. Each pixel includes a light emitting element EE.

The pixel receives a data writing gate signal GW, a compensation gate signal GC, a data initialization gate signal GI, a light emitting element initialization gate signal GB, the data voltage VDATA and the emission signal EM and the light emitting element EE of the pixel emits light corresponding to the level of the data voltage VDATA to display the image.

In the present embodiment, switching elements of the pixel may be polysilicon thin film transistors. For example, the switching elements of the pixel may be a low temperature polysilicon (LTPS) thin film transistors. For example, the switching elements of the pixel may be P-type transistors.

Alternatively, the pixel may include at least one oxide thin film transistor. The pixel may include at least one N-type transistor.

For example, the pixel may include first, second, third, fourth, fifth, sixth and seventh pixel switching elements PT1, PT2, PT3, PT4, PT5, PT6 and PT7, a storage capacitor CST and the light emitting element EE.

The first pixel switching element PT1 includes a control electrode connected to a first pixel node PN1, an input electrode connected to a second pixel node PN2 and an output electrode connected to a third pixel node PN3.

The second pixel switching element PT2 includes a control electrode receiving the data writing gate signal GW, an input electrode receiving the data voltage VDATA and an output electrode connected to the second pixel node PN2.

The third pixel switching element PT3 includes a control electrode receiving the compensation gate signal GC, an input electrode connected to the first pixel node PN1 and an output electrode connected to the third pixel node PN3.

The fourth pixel switching element PT4 includes a control electrode receiving the data initialization gate signal GI, an input electrode receiving an initialization voltage VI1 and an output electrode connected to the first pixel node PN1.

The fifth pixel switching element PT5 includes a control electrode receiving the emission signal EM, an input electrode receiving a first pixel power voltage ELVDD and an output electrode connected to the second pixel node PN2.

The sixth pixel switching element PT6 includes a control electrode receiving the emission signal EM, an input electrode connected to the third pixel node PN3 and an output electrode connected to an anode electrode of the light emitting element EE.

The seventh pixel switching element PT7 includes a control electrode receiving the light emitting element initialization gate signal GB, an input electrode receiving a second initialization voltage VI2 and an output electrode connected to the anode electrode of the light emitting element EE. Although the second initialization voltage VI2 is applied to the input electrode of the seventh pixel switching element PT7 in the present embodiment, the present inventive concept may not be limited thereto. In an embodiment, the initialization voltage VI1 may be applied to the input electrode of the seventh pixel switching element PT7.

The storage capacitor CST includes a first electrode receiving the first pixel power voltage ELVDD and a second electrode connected to the first pixel node PN1.

The light emitting element EE includes the anode electrode and a cathode electrode receiving a second pixel power voltage ELVSS.

Figure 3:
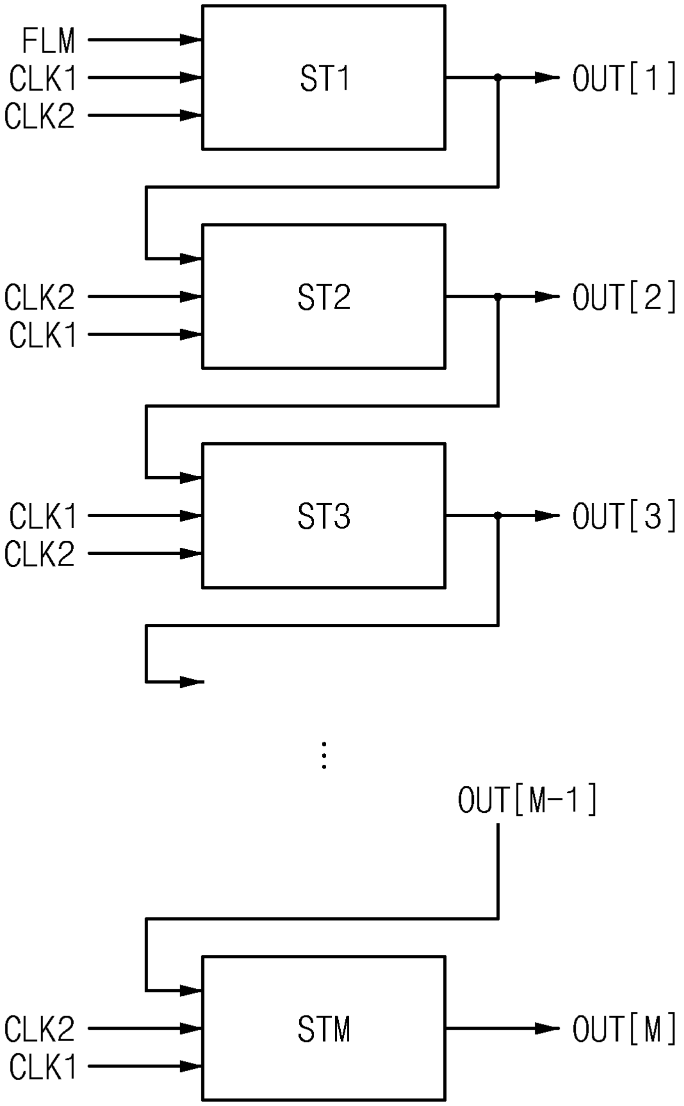
FIG. 3 is a block diagram illustrating a shift register of a gate driver or an emission driver of FIG. 1.
Figure 4:
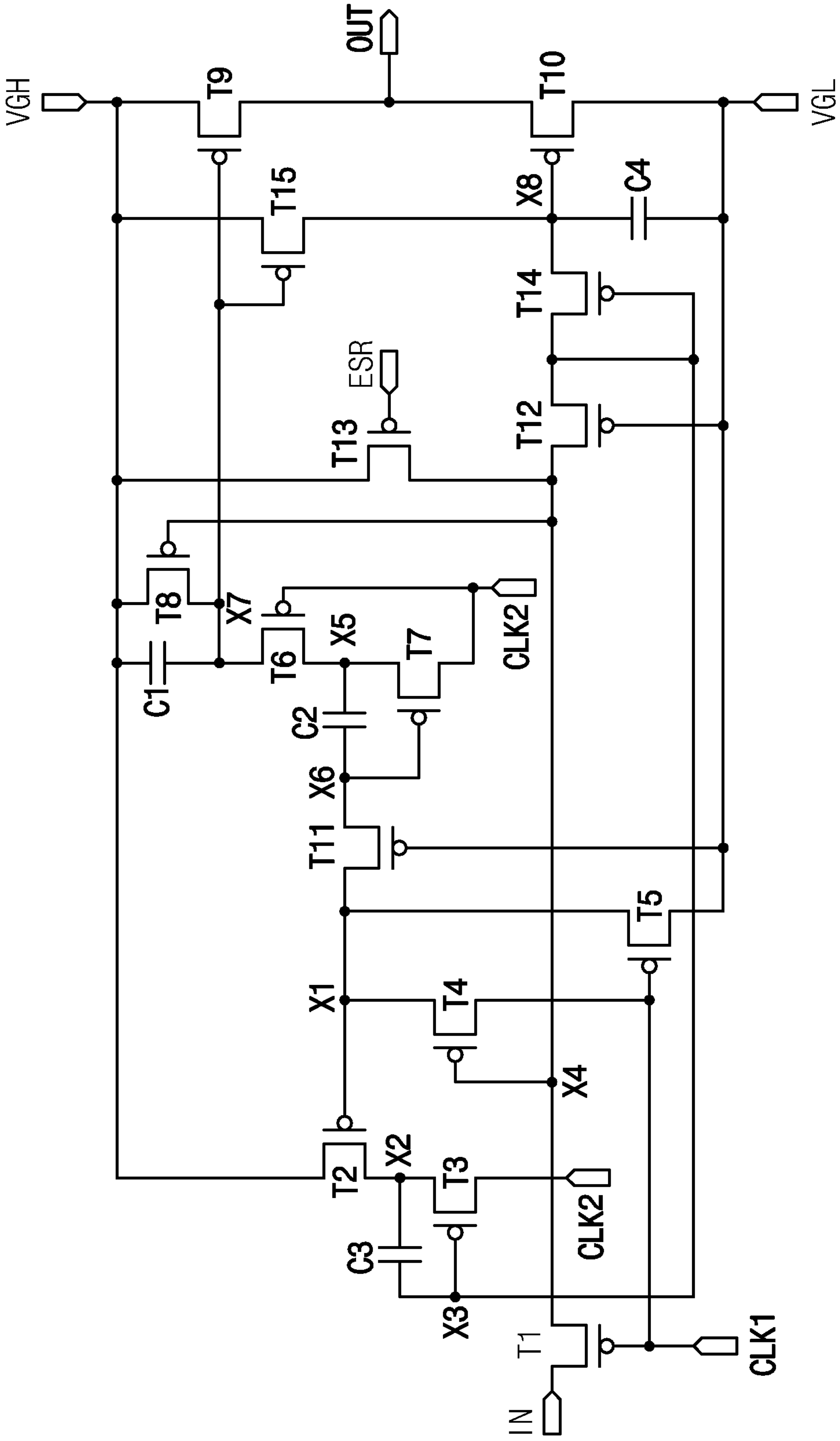
FIG. 4 is a circuit diagram illustrating a stage of the shift register of FIG. 3.
Figure 5:
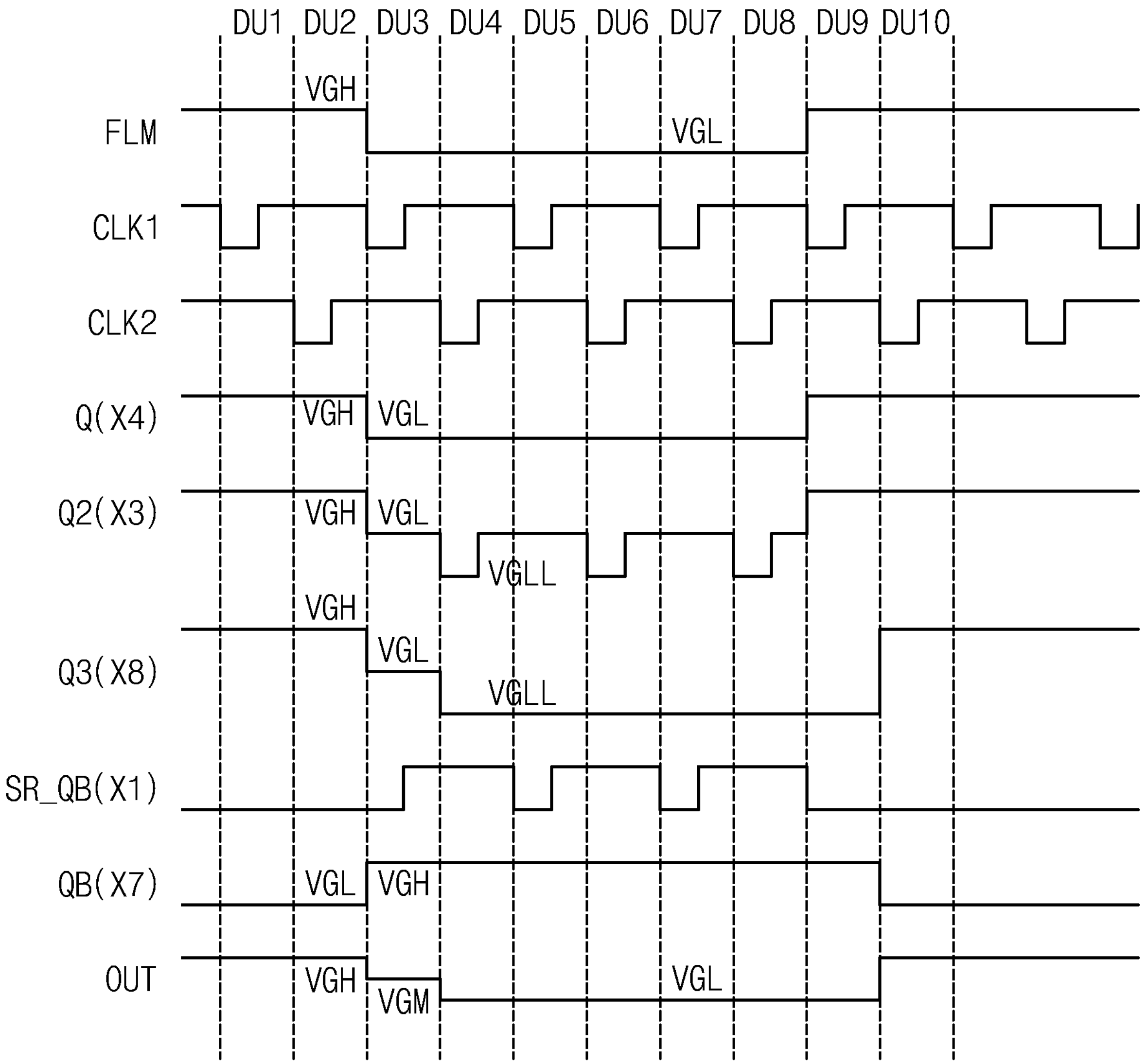
FIG. 5 is a timing diagram illustrating examples of input signals, node signals and an output signal of the shift register of FIG. 3.
Figure 6:
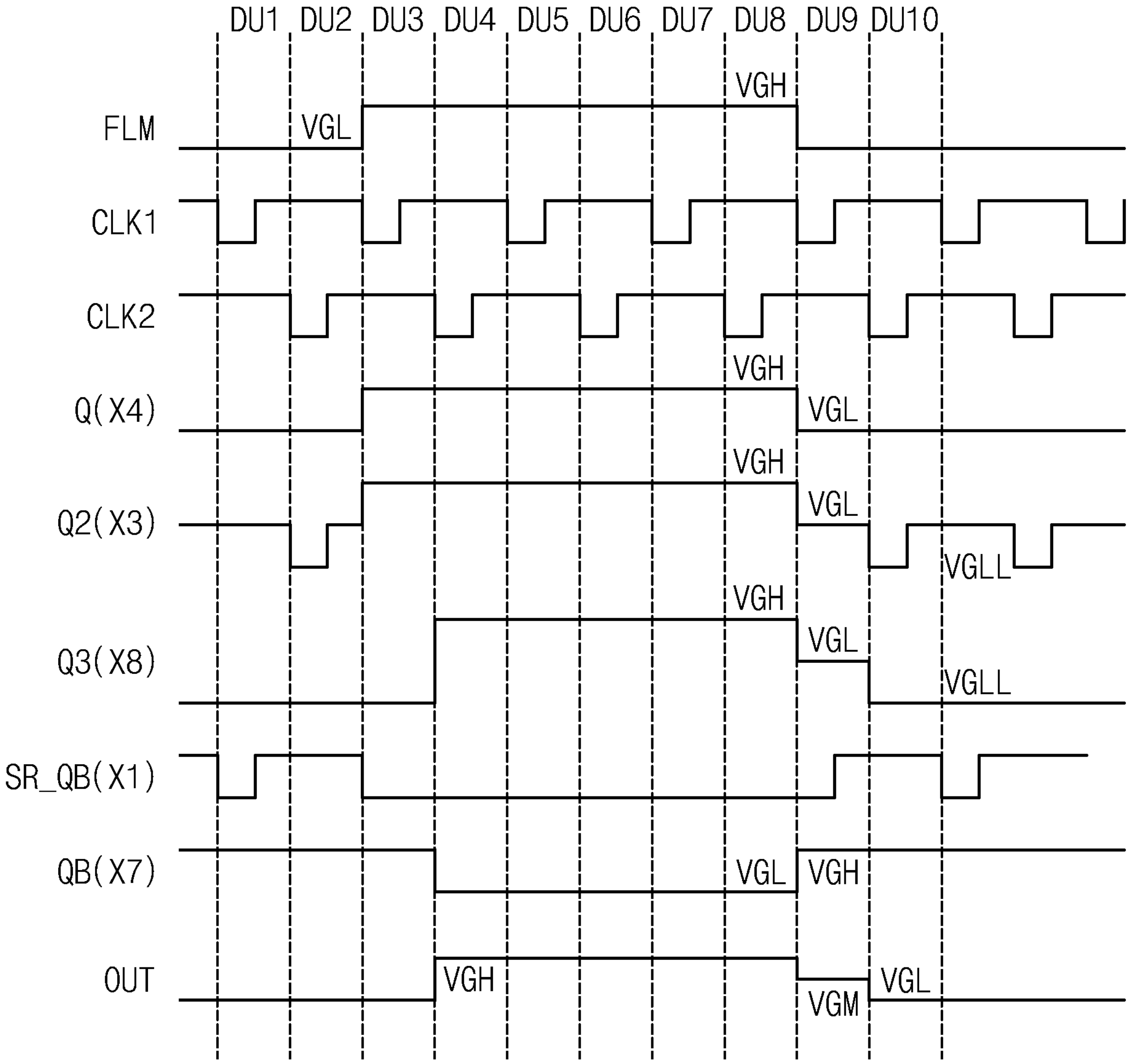
FIG. 6 is a timing diagram illustrating examples of input signals, node signals and an output signal of the shift register of FIG. 3.

FIG. 3 is a block diagram illustrating a shift register of the gate driver 300 or the emission driver 600 of FIG. 1. FIG. 4 is a circuit diagram illustrating a stage of the shift register of FIG. 3. FIG. 5 is a timing diagram illustrating examples of input signals, node signals and an output signal of the shift register of FIG. 3. FIG. 6 is a timing diagram illustrating examples of input signals, node signals and an output signal of the shift register of FIG. 3.

Referring to FIGS. 1 to 6, at least one of the gate driver 300 and emission driver 600 may include the shift register of FIG. 3.

For example, the gate driver 300 may include the shift register. For example, the shift register may generate the compensation gate signal GC applied to the third pixel switching element PT3. For example, the shift register may generate the data initialization gate signal GI applied to the fourth pixel switching element PT4.

For example, the emission driver 600 may include the shift register. The shift register may generate the emission signal EM applied to the fifth pixel switching element PT5 and the sixth pixel switching element PT6.

The shift register includes a plurality of stages ST1 to STM. The stages ST1 to STM output the output signal OUT to the display region AA of the display panel 100. When the shift register outputs the compensation gate signal GC to the display region AA of the display panel 100, the number of the stages ST1 to STM may be same as the number of compensation gate lines GCL of the display region AA of the display panel 100. When the shift register outputs the emission signal EM to the display region AA of the display panel 100, the number of the stages ST1 to STM may be same as the number of the emission lines EML of the display region AA of the display panel 100. For example, the number of the stages ST1 to STM may be same as the number of pixel rows of the display region AA of the display panel 100.

At least one of the stages ST1 to STM may receive an input signal IN, a first clock signal CLK1, a second clock signal CLK2, a first power voltage VGH and a second power voltage VGL and output the output signal OUT. At least one of the stages ST1 to STM may further receive a protection signal ESR.

The first power voltage VGH may be a high power voltage. The second power voltage VGL may be a low power voltage. A timing of the first clock signal CLK1 may be different from a timing of the second clock signal CLK2.

Each stage ST1 to STM outputs the output signal OUT and the output signal OUT is inputted to an input terminal of a next stage. An input signal of the stage may be the output signal OUT of a previous stage. The first stage ST1 does not have a previous stage so that a vertical start signal FLM may be inputted to an input terminal of the first stage ST1.

An output signal OUT[1] of the first stage ST1 is outputted to the display region AA through a first compensation gate line or a first emission line. The output signal OUT[1] of the first stage ST1 is applied to an input terminal of a second stage ST2.

An output signal OUT[2] of the second stage ST2 is outputted to the display region AA through a second compensation gate line or a second emission line. The output signal OUT[2] of the second stage ST2 is applied to an input terminal of a third stage ST3.

An output signal OUT[3] of the third stage ST3 is outputted to the display region AA through a third compensation gate line or a third emission line. The output signal OUT[3] of the third stage ST3 is applied to an input terminal of a fourth stage ST4.

An output signal OUT[M] of an M-th stage STM is outputted to the display region AA through an M-th compensation gate line or an M-th emission line. The output signal OUT[M−1] of an (M−1)-th stage is applied to an input terminal of the M-th stage STM.

The first clock signal CLK1 and the second clock signal CLK2 may be alternately applied to the stages. For example, the first clock signal CLK1 may be applied to a first clock terminal of the first stage ST1 and the second clock signal CLK2 may be applied to a second clock terminal of the first stage ST1. In contrast, the second clock signal CLK2 may be applied to a first clock terminal of the second stage ST2 and the first clock signal CLK1 may be applied to a second clock terminal of the second stage ST2. The first clock signal CLK1 may be applied to a first clock terminal of the third stage ST3 and the second clock signal CLK2 may be applied to a second clock terminal of the third stage ST3.

At least one of the stages may include a ninth switching element T9 connected between a first power voltage terminal receiving the first power voltage VGH and an output terminal outputting the output signal OUT and a tenth switching element T10 connected between a second power voltage terminal receiving the second power voltage VGL and the output terminal.

The ninth switching element T9 may be a pull up switching element pulling up the output signal OUT to the first power voltage VGH. The tenth switching element T10 may be a pull down switching element pulling down the output signal OUT to the second power voltage VGL.

At least one of the stages may include a first pull down control switching element (a fourteenth switching element) T14 connected to a control electrode of the pull down switching element T10 and a second pull down control switching element (a fifteenth switching element) T15 connected to the first power voltage terminal and the control electrode of the pull down switching element T10. The first pull down control switching element may have a diode connection.

The stage may further include a thirteenth switching element T13 applying the first power voltage VGH to a control electrode of the tenth switching element T10 in response to the protection signal ESR. The thirteenth switching element T13 is referred as a protection switching element.

In the present embodiment, the thirteenth switching element T13 may apply the first power voltage VGH to a fourth node X4.

The protection signal ESR applied to the thirteenth switching element T13 may turn on the thirteenth switching element T13 in an initial driving period and may turn off the thirteenth switching element T13 in a normal driving period after the initial driving period.

In the present embodiment, the stage of the shift register includes the thirteenth switching element T13 so that an image flashing occurred at the initial driving period and an abnormal off situation may be prevented.

The stage may include a pull down circuit for operating of pulling down the output signal OUT to the second power voltage VGL. The pull down circuit may include a first switching element T1, a second switching element T2, a third switching element T3, the tenth switching element T10, a twelfth switching element T12, a fourteenth switching element T14 and a fifteenth switching element T15.

The first switching element T1 may output the input signal (FLM or OUT of the previous stage) to a fourth node X4 in response to the first clock signal CLK1. A control electrode of the first switching element T1 may be connected to the first clock terminal receiving the first clock signal CLK1. An input electrode of the first switching element T1 may be connected to an input terminal receiving the input signal. An output electrode of the first switching element T1 may be connected to the fourth node X4.

The second switching element T2 may output the first power voltage VGH to a second node X2 in response to a voltage of a first node X1. A control electrode of the second switching element T2 may be connected to the first node X1. An input electrode of the second switching element T2 may be connected to the first power voltage terminal. An output electrode of the second switching element T2 may be connected to the second node X2.

The third switching element T3 may output a voltage of a third node X3 to the second node X2 in response to the second clock signal CLK2. A control electrode of the third switching element T3 may be connected to the third node X3. An input electrode of the third switching element T3 may be connected to the second clock terminal receiving the second clock signal CLK2. An output electrode of the third switching element T3 may be connected to the second node X2.

The tenth switching element T10 may output the second power voltage VGL to an output terminal outputting the output signal OUT in response to a voltage of an eighth node X8. A control electrode of the tenth switching element T10 may be connected to the eighth node X8. An input electrode of the tenth switching element T10 may be connected to the second power voltage terminal. An output electrode of the tenth switching element T10 may be connected to the output terminal.

The twelfth switching element T12 may output a voltage of the fourth node X4 to the third node X3 in response to the second power voltage VGL. A control electrode of the twelfth switching element T12 may be connected to the second power voltage terminal. An input electrode of the twelfth switching element T12 may be connected to the fourth node X4. An output electrode of the twelfth switching element T12 may be connected to the third node X3.

A control electrode of the fourteenth switching element T14 may be connected to the third node X3. An input electrode of the fourteenth switching element T14 may be connected to the third node X3. An output electrode of the fourteenth switching element T14 may be connected to the eighth node X8.

The stage may include a pull up circuit for operating of pulling up the output signal OUT to the first power voltage VGH. The pull up circuit may include a fourth switching element T4, a fifth switching element T5, a sixth switching element T6, a seventh switching element T7, an eighth switching element T8, the ninth switching element T9 and an eleventh switching element T11.

The fourth switching element T4 may output the first clock signal CLK1 to the first node in response to the voltage of the fourth node X4. A control electrode of the fourth switching element T4 may be connected to the fourth node X4. An input electrode of the fourth switching element T4 may be connected to the first clock terminal. An output electrode of the fourth switching element T4 may be connected to the first node X1.

The fifth switching element T5 may output the second power voltage VGL to the first node X1 in response to the first clock signal CLK1. A control electrode of the fifth switching element T5 may be connected to the first clock terminal. An input electrode of the fifth switching element T5 may be connected to the second power voltage terminal. An output electrode of the fifth switching element T5 may be connected to the first node X1.

The sixth switching element T6 may connect a fifth node X5 to a seventh node X7 in response to the second clock signal CLK2. A control electrode of the sixth switching element T6 may be connected to the second clock terminal. An input electrode of the sixth switching element T6 may be connected to the fifth node X5. An output electrode of the sixth switching element T6 may be connected to the seventh node X7.

The seventh switching element T7 may output the second clock signal CLK2 to the fifth node X5 in response to a voltage of the sixth node X6. A control electrode of the seventh switching element T7 may be connected to the sixth node X6. An input electrode of the seventh switching element T7 may be connected to the second clock terminal. An output electrode of the seventh switching element T7 may be connected to the fifth node X5.

The eighth switching element T8 may output the first power voltage VGH to the seventh node X7 in response to the voltage of the fourth node X4. A control electrode of the eighth switching element T8 may be connected to the fourth node X4. An input electrode of the eighth switching element T8 may be connected to the first power voltage terminal. An output electrode of the eighth switching element T8 may be connected to the seventh node X7.

The ninth switching element T9 may output the first power voltage VGH to the output terminal in response to the voltage of the seventh node X7. A control electrode of the ninth switching element T9 may be connected to the seventh node X7. An input electrode of the ninth switching element T9 may be connected to the first power voltage terminal VGH. An output electrode of the ninth switching element T9 may be connected to the output terminal.

The eleventh switching element T11 may connect the first node X1 to the sixth node X6 in response to the second power voltage VGL. A control electrode of the eleventh switching element T11 may be connected to the second power voltage terminal. An input electrode of the eleventh switching element T11 may be connected to the first node X1. An output electrode of the eleventh switching element T11 may be connected to the sixth node X6.

The stage may further include a first capacitor C1 including a first electrode connected to the first power voltage terminal and a second electrode connected to the seventh node X7. The stage may further include the second capacitor C2 including a first electrode connected to the fifth node X5 and a second electrode connected to the sixth node X6. The stage may further include the third capacitor C3 including a first electrode connected to the second node X2 and a second electrode connected to the third node X3. The stage may further include the fourth capacitor C4 including a first electrode connected to the control electrode (the eighth node X8) of the pull down switching element T10 and a second electrode connected to the second power voltage terminal.

The first capacitor C1 may be a stabilization capacitor for stabilizing the voltage of the seventh node X7. The second capacitor C2 may be a boosting capacitor for sufficiently pulling down the voltage of the seventh node X7 to a low level. The third capacitor C3 may be a boosting capacitor for sufficiently pulling down the voltage of the third node X3 to a low level. The fourth capacitor C4 may be a stabilization capacitor for stabilizing the voltage of the eighth node X8.

The fourth node X4 may be referred as a Q node. In addition, the third node X3 is connected to the fourth node X4 in response to the second power voltage VGL applied to the twelfth switching element T12 so that the third node X3 may be also referred as a Q2 node. The eighth node X8 is connected to the third node X3 through a diode connection of the fourteenth switching element T14 so that the eighth node X8 may be also referred as a Q3 node. In addition, the seventh node X7 may be referred as a QB node. The first node X1 may be referred as a SR_QB node.

In some embodiments, the first to fifteenth switching elements T1 to T15 may be P-type thin film transistors. The control electrodes of the first to fifteenth switching elements T1 to T15 may be gate electrodes, the input electrodes of the first to fifteenth switching elements T1 to T15 may be source electrodes and the output electrodes of the first to fifteenth switching elements T1 to T15 may be drain electrodes.

The output signal OUT of FIG. 5 is an example of a gate signal having a low level (an activation level) for only a few horizontal periods within a frame and a high level (a deactivation level) for a remaining long period within the frame. For example, the output signal OUT of FIG. 5 may be the compensation gate signal GC applied to the third pixel switching element PT3.

The output signal OUT of FIG. 6 is an example of the emission signal having a high level (a deactivation level) for only a few horizontal periods within a frame and a low level (an activation level) for a remaining long period within the frame. For example, the output signal OUT of FIG. 6 may be applied to the fifth and sixth pixel switching elements PT5 and PT6.

In FIGS. 5 and 6, the first clock signal CLK1 may have low pulses in first, third, fifth, seventh and ninth durations DU1, DU3, DU5, DU7 and DU9 and the second clock signal CLK2 may have low pulses in second, fourth, sixth and eighth durations DU2, DU4, DU6 and DU8.

As shown in FIG. 6, when the first clock signal CLK1 has the low level VGL while the high level VGH of the vertical start signal FLM is applied to the input terminal, the voltage of the fourth node X4 increases to the high level VGH applied to the input terminal.

Then, when the second clock signal CLK2 has the low level VGL, the voltage of the seventh node X7 decreases to the low level VGL and the output signal OUT increases to the high level VGH.

When the first clock signal CLK1 has the low level VGL while the signal of the input terminal decreases to the low level VGL, the voltage of the fourth node X4 decreases to a first low level (e.g. VGL), the voltage of the seventh node X7 increases to the high level VGH and the output signal OUT decreases to an intermediate level VGM (e.g. VGL+2|VTH|). The intermediate level VGM (e.g. VGL+2|VTH|) of the output signal OUT has a level slightly higher than the second power voltage VGL. A 2|VTH| component of the intermediate level VGM (e.g. VGL+2|VTH|) of the output signal OUT may be a sum of a threshold voltage of the first switching element T1 and a threshold voltage of the tenth switching element T10.

Then, when the second clock signal CLK2 has the low level VGL, the voltage of the third node X3 decreases to a second low level VGLL. Herein, the output signal OUT decreases from the intermediate level VGM to the low level VGL. When the intermediate level VGM or the low level VGL of the output signal OUT is applied to the switching element of the display panel 100, the switching element of the display panel 100 may be turned on.

In addition, the voltage of the first node X1 has a waveform substantially the same as the voltage of the first clock signal CLK1 during a period in which the input signal FLM has the low level by the fourth switching element T4 turned on during the period in which the input signal FLM has the low level. The voltage of the first node X1 may maintain a low level during a period in which the input signal FLM has the high level.

When the signal of the input terminal maintains the low level VGL, the voltage of the third node X3 swings between the first low level VGL and the second low level VGLL according to the toggling of the second clock signal CLK2.

However, the eighth node X8 and the third node X3 may be separated by the diode connection of the fourteenth switching element T14. Thus, when the signal of the input terminal maintains the low level VGL (e.g. between DU1 and DU2 and after a beginning of DU9), the voltage of the eighth node X8 does not swing between the first low level VGL and the second low level VGLL and but maintains the second low level VGLL despite the toggling of the second clock signal CLK2.

Therefore, the control signal of the tenth switching element T10 may maintain a stable level (e.g. between DU1 and DU2 and after a beginning of DU10) so that the output signal OUT of the shift register may have a stable low level.

The timing diagram of FIG. 5 is substantially the same as the timing diagram of FIG. 6 except that the waveform of the input signal (e.g. the FLM signal) has a low level VGL and a high level VGH reversed.

In the timing diagram of FIG. 5, the stage of the shift register may output the output signal OUT having a low level VGL only for a few horizontal periods within the frame according to the waveform of the input signal (e.g. the FLM signal).

For the embodiment of FIG. 5, the eighth node X8 and the third node X3 may be separated by the diode connection of the fourteenth switching element T14. Thus, when the signal of the input terminal maintains the low level VGL (e.g. between DU3 and DU8), the voltage of the eighth node X8 does not swing between the first low level VGL and the second low level VGLL and but maintains the second low level VGLL despite the toggling of the second clock signal CLK2.

Therefore, the control signal of the tenth switching element T10 may maintain a stable level (e.g. between DU4 and DU9) so that the output signal OUT of the shift register may have a stable low level.

According to the present embodiment, the first pull down control switching element T14 and the second pull down control switching element T15 may be connected to the control electrode of the pull down switching element T10. The first pull down control switching element T14 has a diode connection so that a toggling of the third node X3 may not be transmitted to the eighth node X8. Thus, the level of the control signal of the pull down switching element T10 for pulling down the output signal OUT may be stably maintained.

The level of the control signal of the pull down switching element T10 is stably maintained so that the low level of the output signal OUT may be stably maintained. The low level of the output signal OUT is stably maintained so that the reliability of the gate driver 300 and the emission driver 600 may be enhanced. In addition, the low level of the output signal OUT is stably maintained so that the display quality of the display panel 100 may be enhanced.

Figure 7:
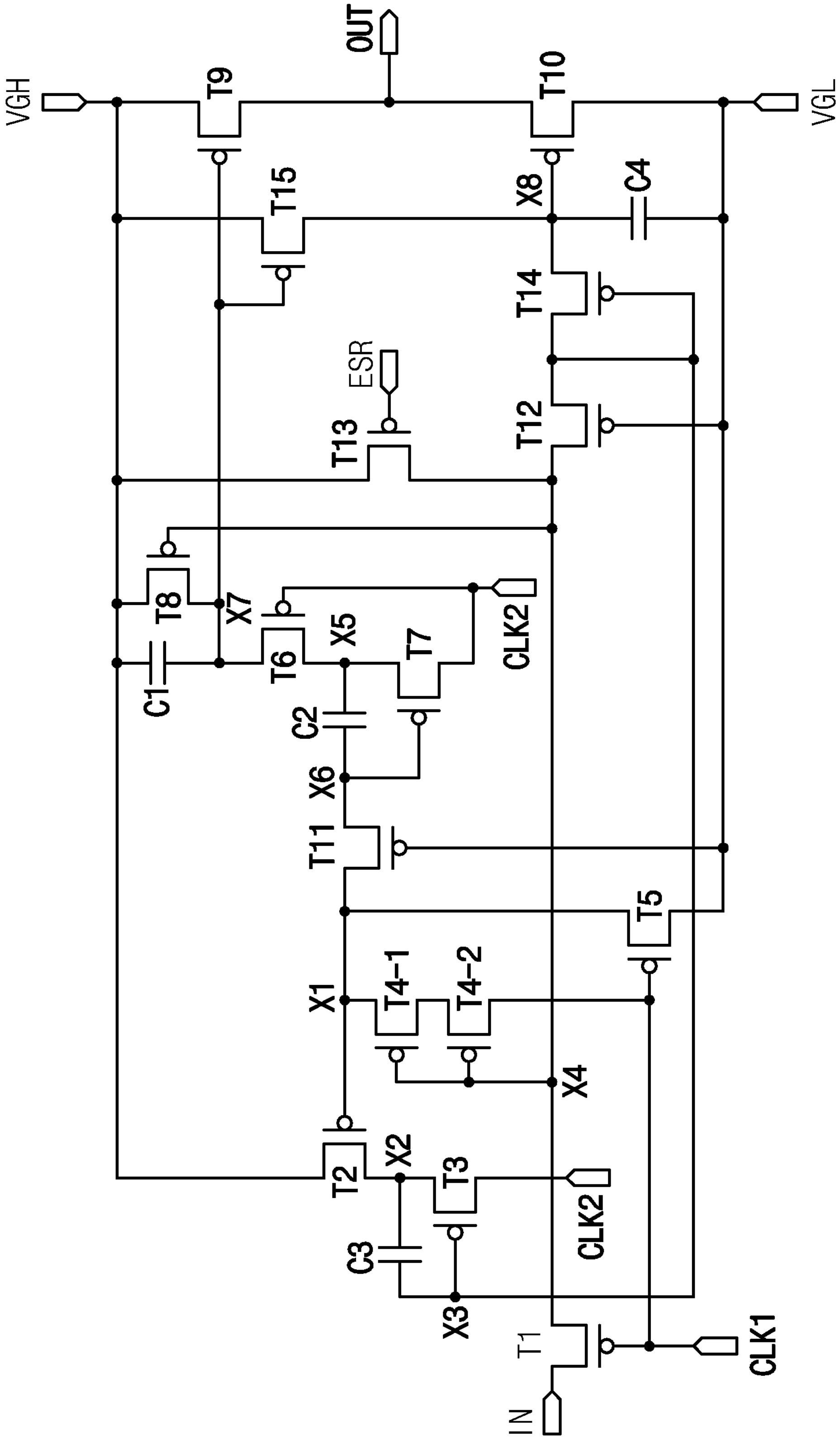
FIG. 7 is a circuit diagram illustrating a stage of a shift register of a display apparatus according to an embodiment of the present inventive concept.

FIG. 7 is a circuit diagram illustrating a stage of a shift register of a display apparatus according to an embodiment of the present inventive concept.

The shift register of the display apparatus according to the present embodiment is substantially the same as the shift register of the display apparatus of the previous embodiment explained referring to FIG. 4 except that the fourth switching element includes two transistors connected to each other in series. Thus, the same reference numerals will be used to refer to the same or like parts as those described in the previous embodiment of FIGS. 1 to 6 and any repetitive explanation concerning the above elements will be omitted.

Referring to FIGS. 1 to 3 and 5 to 7, the display apparatus includes a display panel 100 and a display panel driver. The display panel driver includes a driving controller 200, a gate driver 300, a gamma reference voltage generator 400, a data driver 500 and an emission driver 600.

At least one of the gate driver 300 and emission driver 600 may include the shift register of FIG. 7.

The shift register includes a plurality of stages ST1 to STM. The stages ST1 to STM output the output signal OUT to the display region AA of the display panel 100.

At least one of the stages ST1 to STM may receive an input signal IN, a first clock signal CLK1, a second clock signal CLK2, a first power voltage VGH and a second power voltage VGL and output the output signal OUT. At least one of the stages ST1 to STM may further receive a protection signal ESR.

At least one of the stages may include a ninth switching element T9 connected between a first power voltage terminal receiving the first power voltage VGH and an output terminal outputting the output signal OUT and a tenth switching element T10 connected between a second power voltage terminal receiving the second power voltage VGL and the output terminal.

The ninth switching element T9 may be a pull up switching element pulling up the output signal OUT to the first power voltage VGH. The tenth switching element T10 may be a pull down switching element pulling down the output signal OUT to the second power voltage VGL.

At least one of the stages may include a first pull down control switching element (a fourteenth switching element) T14 connected to a control electrode of the pull down switching element T10 and a second pull down control switching element (a fifteenth switching element) T15 connected to the first power voltage terminal and the control electrode of the pull down switching element T10. The first pull down control switching element may have a diode connection.

In the present embodiment, at least one of the stages may include a 4-1 switching element T4-1 and a 4-2 switching element T4-2. The 4-1 switching element T4-1 may include a control electrode connected to the fourth node X4, a first electrode connected to the first node X1 and a second electrode connected to a fourth intermediate node. The 4-2 switching element T4-2 may include a control electrode connected to the fourth node X4, a first electrode connected to the fourth intermediate node and a second electrode receiving the first clock signal CLK1.

In the present embodiment, at least one of the stages includes the 4-1 switching element T4-1 and the 4-2 switching element T4-2 connected to each other in series so that the current leakage of the first node X1 may be prevented and accordingly the reliability of the shift register circuit may be enhanced.

According to the present embodiment, the first pull down control switching element T14 and the second pull down control switching element T15 may be connected to the control electrode of the pull down switching element T10. The first pull down control switching element T14 has a diode connection so that a toggling of the third node X3 may not be transmitted to the eighth node X8. Thus, the level of the control signal of the pull down switching element T10 for pulling down the output signal OUT may be stably maintained.

The level of the control signal of the pull down switching element T10 is stably maintained so that the low level of the output signal OUT may be stably maintained. The low level of the output signal OUT is stably maintained so that the reliability of the gate driver 300 and the emission driver 600 may be enhanced. In addition, the low level of the output signal OUT is stably maintained so that the display quality of the display panel 100 may be enhanced.

Figure 8:
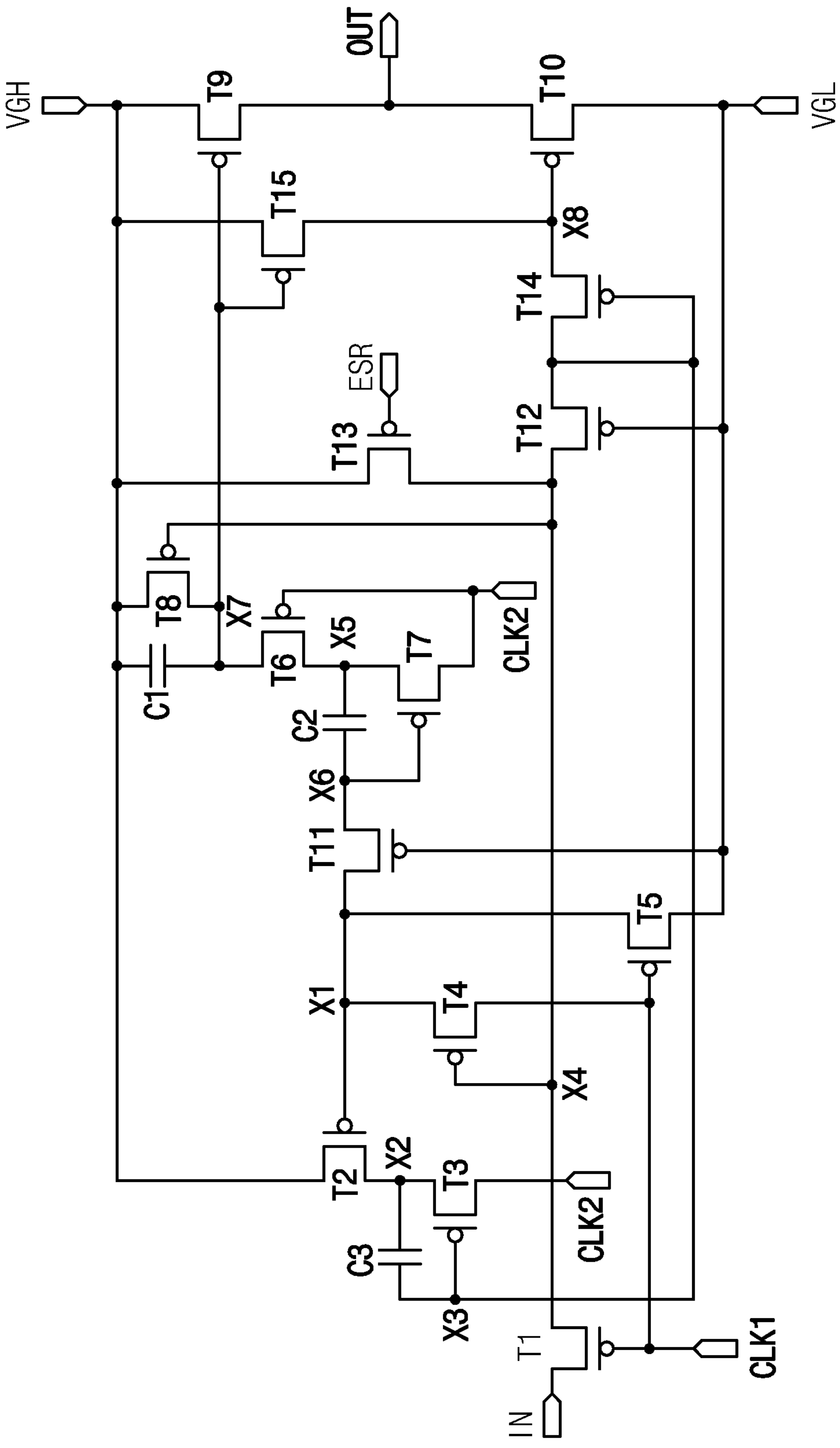
FIG. 8 is a circuit diagram illustrating a stage of a shift register of a display apparatus according to an embodiment of the present inventive concept.

FIG. 8 is a circuit diagram illustrating a stage of a shift register of a display apparatus according to an embodiment of the present inventive concept.

The shift register of the display apparatus according to the present embodiment is substantially the same as the shift register of the display apparatus of the previous embodiment explained referring to FIG. 4 except that the shift register does not include the fourth capacitor. Thus, the same reference numerals will be used to refer to the same or like parts as those described in the previous embodiment of FIGS. 1 to 6 and any repetitive explanation concerning the above elements will be omitted.

Referring to FIGS. 1 to 3, 5, 6 and 8, the display apparatus includes a display panel 100 and a display panel driver. The display panel driver includes a driving controller 200, a gate driver 300, a gamma reference voltage generator 400, a data driver 500 and an emission driver 600.

At least one of the gate driver 300 and emission driver 600 may include the shift register of FIG. 8.

The shift register includes a plurality of stages ST1 to STM. The stages ST1 to STM output the output signal OUT to the display region AA of the display panel 100.

At least one of the stages ST1 to STM may receive an input signal IN, a first clock signal CLK1, a second clock signal CLK2, a first power voltage VGH and a second power voltage VGL and output the output signal OUT. At least one of the stages ST1 to STM may further receive a protection signal ESR.

At least one of the stages may include a ninth switching element T9 connected between a first power voltage terminal receiving the first power voltage VGH and an output terminal outputting the output signal OUT and a tenth switching element T10 connected between a second power voltage terminal receiving the second power voltage VGL and the output terminal.

The ninth switching element T9 may be a pull up switching element pulling up the output signal OUT to the first power voltage VGH. The tenth switching element T10 may be a pull down switching element pulling down the output signal OUT to the second power voltage VGL.

At least one of the stages may include a first pull down control switching element (a fourteenth switching element) T14 connected to a control electrode of the pull down switching element T10 and a second pull down control switching element (a fifteenth switching element) T15 connected to the first power voltage terminal and the control electrode of the pull down switching element T10. The first pull down control switching element may have a diode connection.

In the present embodiment, at least one of the stages may not include the fourth capacitor C4 of FIG. 4. Thus, a dead space of the display apparatus may be reduced and a manufacturing cost of the display apparatus may be reduced.

According to the present embodiment, the first pull down control switching element T14 and the second pull down control switching element T15 may be connected to the control electrode of the pull down switching element T10. The first pull down control switching element T14 has a diode connection so that a toggling of the third node X3 may not be transmitted to the eighth node X8. Thus, the level of the control signal of the pull down switching element T10 for pulling down the output signal OUT may be stably maintained.

The level of the control signal of the pull down switching element T10 is stably maintained so that the low level of the output signal OUT may be stably maintained. The low level of the output signal OUT is stably maintained so that the reliability of the gate driver 300 and the emission driver 600 may be enhanced. In addition, the low level of the output signal OUT is stably maintained so that the display quality of the display panel 100 may be enhanced.

Figure 9:
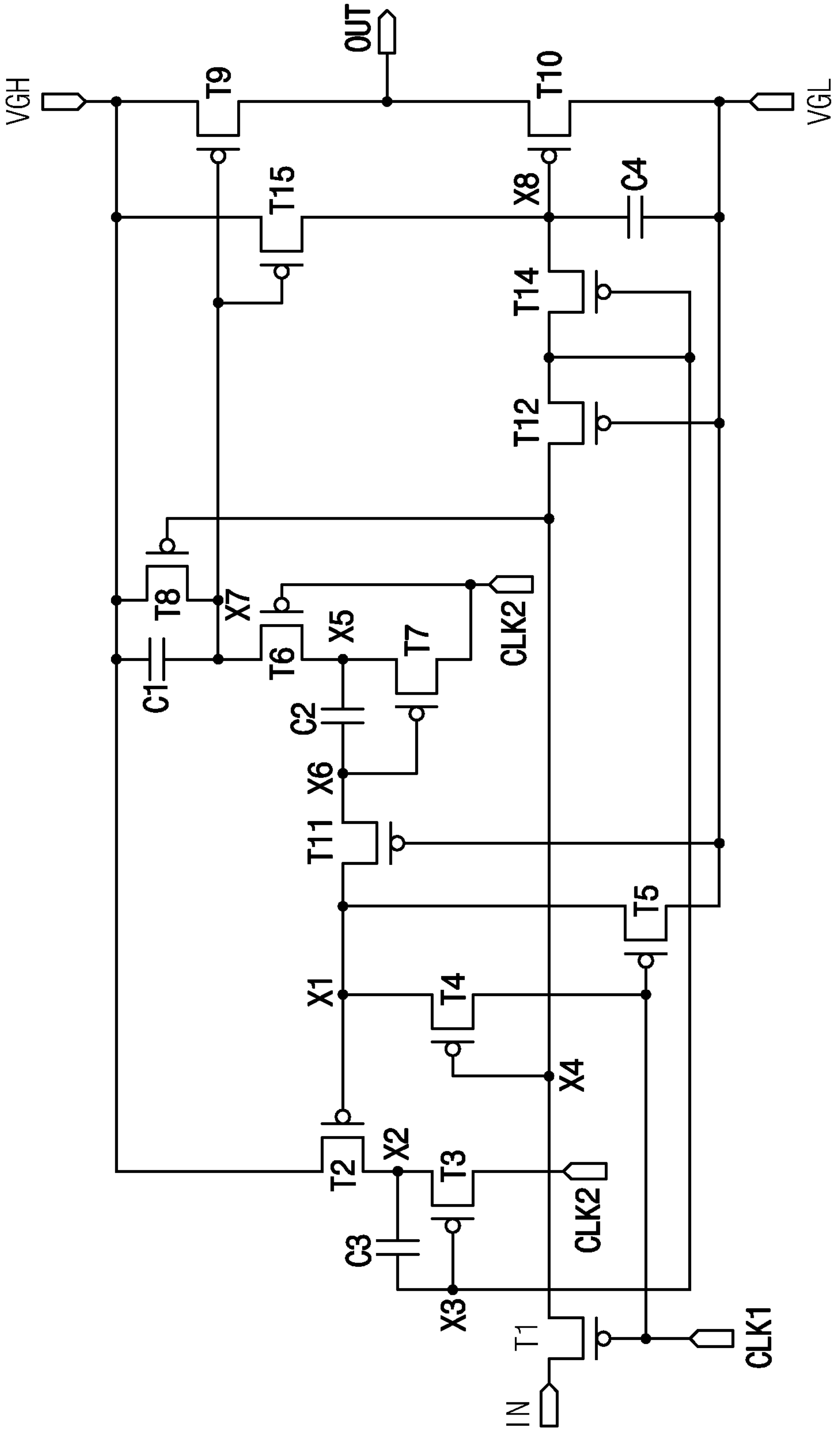
FIG. 9 is a circuit diagram illustrating a stage of a shift register of a display apparatus according to an embodiment of the present inventive concept.

FIG. 9 is a circuit diagram illustrating a stage of a shift register of a display apparatus according to an embodiment of the present inventive concept.

The shift register of the display apparatus according to the present embodiment is substantially the same as the shift register of the display apparatus of the previous embodiment explained referring to FIG. 4 except that the shift register does not include the thirteenth switching element. Thus, the same reference numerals will be used to refer to the same or like parts as those described in the previous embodiment of FIGS. 1 to 6 and any repetitive explanation concerning the above elements will be omitted.

Referring to FIGS. 1 to 3, 5, 6 and 9, the display apparatus includes a display panel 100 and a display panel driver. The display panel driver includes a driving controller 200, a gate driver 300, a gamma reference voltage generator 400, a data driver 500 and an emission driver 600.

At least one of the gate driver 300 and emission driver 600 may include the shift register of FIG. 9.

The shift register includes a plurality of stages ST1 to STM. The stages ST1 to STM output the output signal OUT to the display region AA of the display panel 100.

At least one of the stages ST1 to STM may receive an input signal IN, a first clock signal CLK1, a second clock signal CLK2, a first power voltage VGH and a second power voltage VGL and output the output signal OUT.

At least one of the stages may include a ninth switching element T9 connected between a first power voltage terminal receiving the first power voltage VGH and an output terminal outputting the output signal OUT and a tenth switching element T10 connected between a second power voltage terminal receiving the second power voltage VGL and the output terminal.

The ninth switching element T9 may be a pull up switching element pulling up the output signal OUT to the first power voltage VGH. The tenth switching element T10 may be a pull down switching element pulling down the output signal OUT to the second power voltage VGL.

At least one of the stages may include a first pull down control switching element (a fourteenth switching element) T14 connected to a control electrode of the pull down switching element T10 and a second pull down control switching element (a fifteenth switching element) T15 connected to the first power voltage terminal and the control electrode of the pull down switching element T10. The first pull down control switching element may have a diode connection.

In the present embodiment, at least one of the stages may not include the thirteenth switching element T13 of FIG. 4. Thus, a dead space of the display apparatus may be reduced and a manufacturing cost of the display apparatus may be reduced.

According to the present embodiment, the first pull down control switching element T14 and the second pull down control switching element T15 may be connected to the control electrode of the pull down switching element T10. The first pull down control switching element T14 has a diode connection so that a toggling of the third node X3 may not be transmitted to the eighth node X8. Thus, the level of the control signal of the pull down switching element T10 for pulling down the output signal OUT may be stably maintained.

The level of the control signal of the pull down switching element T10 is stably maintained so that the low level of the output signal OUT may be stably maintained. The low level of the output signal OUT is stably maintained so that the reliability of the gate driver 300 and the emission driver 600 may be enhanced. In addition, the low level of the output signal OUT is stably maintained so that the display quality of the display panel 100 may be enhanced.

Figure 10:
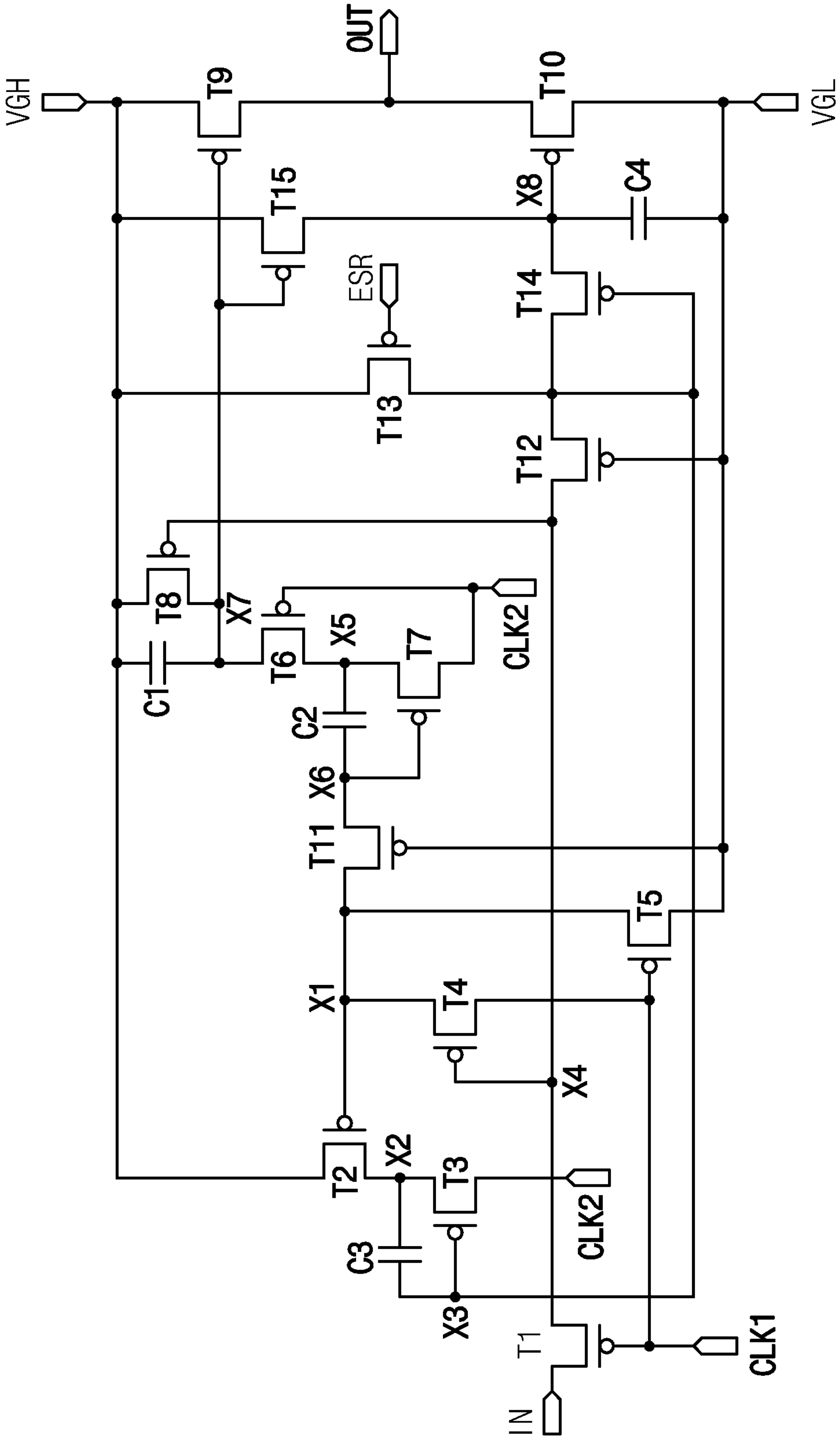
FIG. 10 is a circuit diagram illustrating a stage of a shift register of a display apparatus according to an embodiment of the present inventive concept.

FIG. 10 is a circuit diagram illustrating a stage of a shift register of a display apparatus according to an embodiment of the present inventive concept.

The shift register of the display apparatus according to the present embodiment is substantially the same as the shift register of the display apparatus of the previous embodiment explained referring to FIG. 4 except that the thirteenth switching element T13 is connected not to the fourth node X4 but to the third node X3. Thus, the same reference numerals will be used to refer to the same or like parts as those described in the previous embodiment of FIGS. 1 to 6 and any repetitive explanation concerning the above elements will be omitted.

Referring to FIGS. 1 to 3, 5, 6 and 10, the display apparatus includes a display panel 100 and a display panel driver. The display panel driver includes a driving controller 200, a gate driver 300, a gamma reference voltage generator 400, a data driver 500 and an emission driver 600.

At least one of the gate driver 300 and emission driver 600 may include the shift register of FIG. 10.

The shift register includes a plurality of stages ST1 to STM. The stages ST1 to STM output the output signal OUT to the display region AA of the display panel 100.

At least one of the stages ST1 to STM may receive an input signal IN, a first clock signal CLK1, a second clock signal CLK2, a first power voltage VGH and a second power voltage VGL and output the output signal OUT. At least one of the stages ST1 to STM may further receive a protection signal ESR.

At least one of the stages may include a ninth switching element T9 connected between a first power voltage terminal receiving the first power voltage VGH and an output terminal outputting the output signal OUT and a tenth switching element T10 connected between a second power voltage terminal receiving the second power voltage VGL and the output terminal.

The ninth switching element T9 may be a pull up switching element pulling up the output signal OUT to the first power voltage VGH. The tenth switching element T10 may be a pull down switching element pulling down the output signal OUT to the second power voltage VGL.

At least one of the stages may include a first pull down control switching element (a fourteenth switching element) T14 connected to a control electrode of the pull down switching element T10 and a second pull down control switching element (a fifteenth switching element) T15 connected to the first power voltage terminal and the control electrode of the pull down switching element T10. The first pull down control switching element may have a diode connection.

The stage may further include a thirteenth switching element T13 applying the first power voltage VGH to a control electrode of the tenth switching element T10 in response to the protection signal ESR. The thirteenth switching element T13 is referred as a protection switching element.

In the present embodiment, the thirteenth switching element T13 may apply the first power voltage VGH to the third node X3.

The protection signal ESR applied to the thirteenth switching element T13 may turn on the thirteenth switching element T13 in an initial driving period and may turn off the thirteenth switching element T13 in a normal driving period after the initial driving period.

In the present embodiment, the stage of the shift register includes the thirteenth switching element T13 so that an image flashing occurred at the initial driving period and an abnormal off situation may be prevented.

According to the present embodiment, the first pull down control switching element T14 and the second pull down control switching element T15 may be connected to the control electrode of the pull down switching element T10. The first pull down control switching element T14 has a diode connection so that a toggling of the third node X3 may not be transmitted to the eighth node X8. Thus, the level of the control signal of the pull down switching element T10 for pulling down the output signal OUT may be stably maintained.

The level of the control signal of the pull down switching element T10 is stably maintained so that the low level of the output signal OUT may be stably maintained. The low level of the output signal OUT is stably maintained so that the reliability of the gate driver 300 and the emission driver 600 may be enhanced. In addition, the low level of the output signal OUT is stably maintained so that the display quality of the display panel 100 may be enhanced.

According to the display apparatus of the present inventive concept as explained above, the stability and the reliability of the gate driver and the emission driver may be enhanced and the display quality of the display panel may be enhanced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A shift register comprising a plurality of stages,
   wherein at least one of the stages is configured to receive an input signal, a first clock signal, a second clock signal, a first power voltage and a second power voltage and to output an output signal, and
   wherein the at least one of the stages comprises:
   a pull up switching element connected between a first power voltage terminal configured to receive the first power voltage and an output terminal configured to output the output signal;
   a pull down switching element connected between a second power voltage terminal configured to receive the second power voltage and the output terminal;
   a first pull down control switching element connected to a control electrode of the pull down switching element; and
   a second pull down control switching element connected to the first power voltage terminal and the control electrode of the pull down switching element,
   wherein a first electrode of the first pull down control switching element is connected to the control electrode of the pull down switching element, and a second electrode and a control electrode of the first pull down control switching element are connected to each other.

2. The shift register of claim 1, wherein the at least one of the stages further comprises:
   a first switching element configured to apply the input signal to a fourth node in response to the first clock signal;
   a second switching element configured to apply the first power voltage to a second node in response to a voltage of a first node; and
   a third switching element configured to apply the second clock signal to the second node in response to a voltage of a third node.

3. The shift register of claim 2, wherein the at least one of the stages further comprises a twelfth switching element configured to apply a voltage of the fourth node to the third node in response to the second power voltage.

4. The shift register of claim 3, wherein the at least one of the stages further comprises:

a fourth switching element configured to apply the first clock signal to the first node in response to the voltage of the fourth node;

a fifth switching element configured to apply the second power voltage to the first node in response to the first clock signal;

a sixth switching element configured to connect a fifth node to a seventh node in response to the second clock signal;

a seventh switching element configured to apply the second clock signal to the fifth node in response to a voltage of a sixth node;

an eighth switching element configured to apply the first power voltage to the seventh node in response to the voltage of the fourth node; and an eleventh switching element configured to connect the first node to the sixth node in response to the second power voltage.

5. The shift register of claim 4, wherein the fourth switching element comprises:

a 4-1 switching element including a control electrode connected to the fourth node, a first electrode connected to the first node and a second electrode connected to a fourth intermediate node; and a 4-2 switching element including a control electrode connected to the fourth node, a first electrode connected to the fourth intermediate node and a second electrode configured to receive the first clock signal.

6. The shift register of claim 4, wherein the at least one of the stages further comprises a first capacitor including a first electrode connected to the first power voltage terminal and a second electrode connected to the seventh node.

7. The shift register of claim 4, wherein the at least one of the stages further comprises a second capacitor including a first electrode connected to the fifth node and a second electrode connected to the sixth node.

8. The shift register of claim 4, wherein the at least one of the stages further comprises a third capacitor including a first electrode connected to the second node and a second electrode connected to the third node.

9. The shift register of claim 2, wherein the at least one of the stages further comprises a thirteenth switching element configured to apply the first power voltage to the fourth node in response to a protection signal.

10. The shift register of claim 9, wherein the protection signal is configured to turn on the thirteenth switching element in an initial driving period and to turn off the thirteenth switching element in a normal driving period after the initial driving period.

11. The shift register of claim 2, wherein the at least one of the stages further comprises a thirteenth switching element configured to apply the first power voltage to the third node in response to a protection signal.

12. The shift register of claim 1, wherein the at least one of the stages further comprises a fourth capacitor including a first electrode connected to the control electrode of the pull down switching element and a second electrode connected to the second power voltage terminal.

13. A display apparatus comprising:

a display panel including a pixel;

a gate driver configured to provide a gate signal to the pixel;

a data driver configured to provide a data voltage to the pixel; and an emission driver configured to provide an emission signal to the pixel, wherein at least one of the gate driver and the emission driver comprises a shift register, wherein the shift register comprises a plurality of stages, wherein at least one of the stages is configured to receive an input signal, a first clock signal, a second clock signal, a first power voltage and a second power voltage and to output an output signal, and wherein the at least one of the stages comprises:

a pull up switching element connected between a first power voltage terminal configured to receive the first power voltage and an output terminal configured to output the output signal;

a pull down switching element connected between a second power voltage terminal configured to receive the second power voltage and the output terminal;

a first pull down control switching element connected to a control electrode of the pull down switching element; and a second pull down control switching element connected to the first power voltage terminal and the control electrode of the pull down switching element, wherein a first electrode of the first pull down control switching element is connected to the control electrode of the pull down switching element, and a second electrode and a control electrode of the first pull down control switching element are connected to each other.

14. The display apparatus of claim 13, wherein the gate driver comprises the shift register.

15. The display apparatus of claim 13, wherein the emission driver comprises the shift register.

16. The display apparatus of claim 13, wherein the at least one of the stages further comprises:

a first switching element configured to apply the input signal to a fourth node in response to the first clock signal;

a second switching element configured to apply the first power voltage to a second node in response to a voltage of a first node; and a third switching element configured to apply the second clock signal to the second node in response to a voltage of a third node.

17. The display apparatus of claim 16, wherein the at least one of the stages further comprises a twelfth switching element configured to apply a voltage of the fourth node to the third node in response to the second power voltage.

18. The display apparatus of claim 16, wherein the at least one of the stages further comprises a thirteenth switching element configured to apply the first power voltage to the fourth node in response to a protection signal.

19. The display apparatus of claim 16, wherein the at least one of the stages further comprises a thirteenth switching element configured to apply the first power voltage to the third node in response to a protection signal.

20. The display apparatus of claim 13, wherein the at least one of the stages further comprises a fourth capacitor including a first electrode connected to the control electrode of the pull down switching element and a second electrode connected to the second power voltage terminal.

* * * * *